United States Patent
Aubrey

(10) Patent No.: US 7,461,964 B1
(45) Date of Patent: Dec. 9, 2008

(54) FLUORESCENT LIGHTING FIXTURE ASSEMBLIES

(76) Inventor: Truman Aubrey, 1472 Beaudry Blvd., Glendale, CA (US) 91208

(*) Notice: Subject to any disclaimer, the term of this patent is extended or adjusted under 35 U.S.C. 154(b) by 313 days.

(21) Appl. No.: 11/254,915

(22) Filed: Oct. 21, 2005

Related U.S. Application Data

(62) Division of application No. 10/446,225, filed on May 29, 2003, now Pat. No. 6,974,233.

(51) Int. Cl.
H01R 33/00 (2006.01)

(52) U.S. Cl. .......... 362/647; 362/652; 362/260; 362/655

(58) Field of Classification Search .......... 362/260, 362/640, 647, 649, 650, 652, 655, 656, 364, 362/365, 368, 294, 373, 429, 430; 439/300, 439/226, 236
See application file for complete search history.

(56) References Cited

U.S. PATENT DOCUMENTS

| | | | | |
|---|---|---|---|---|
| 4,709,313 A | * | 11/1987 | Goralnik | 362/414 |
| 4,975,813 A | * | 12/1990 | Chen | 362/650 |
| 5,044,974 A | * | 9/1991 | Pelton et al. | 439/307 |
| 5,073,845 A | * | 12/1991 | Aubrey | 362/650 |
| 5,199,783 A | * | 4/1993 | Pelton | 362/260 |
| 5,662,414 A | * | 9/1997 | Jennings et al. | 362/366 |

* cited by examiner

*Primary Examiner*—Thomas M Sember
(74) *Attorney, Agent, or Firm*—G. Donald Weber, Jr.

(57) ABSTRACT

Retrofit fluorescent lighting fixtures for installation into a surface mounted cylindrical lighting fixture of the square or cylindrical shape. A 4-wire assembly is used for replacing conventional incandescent light bulbs with fluorescent light bulbs in existing lighting fixtures recessed downlights, in particular. The retrofit lighting fixtures include, inter alia, a threaded connector, a ballast, a heat exchanger, a fluorescent light source connector and a threaded body for receiving a reflector glass.

18 Claims, 8 Drawing Sheets

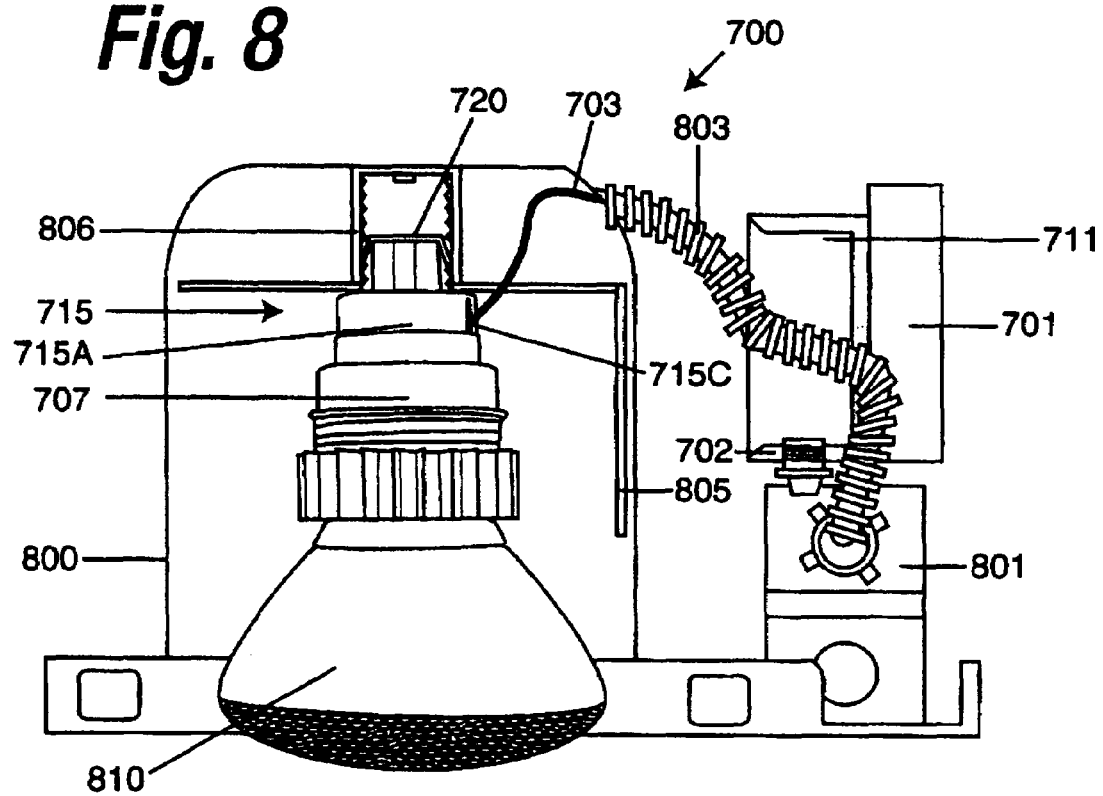

FLUORESCENT LIGHTING FIXTURE ASSEMBLIES

This application is a divisional application of Ser. No. 10/446,225, filed on May 29, 2003 now U.S. Pat. No. 6,974,233, entitled FLUORESCENT LIGHTING FIXTURE ASSEMBLIES by Truman Aubrey

BACKGROUND OF THE INVENTION

1. Field of the Invention

This invention is directed to retrofit units for light fixtures, in general, and to retrofit units which permit fluorescent or similar light bulbs to replace incandescent light bulbs in a downlight-style or a cylinder-type fixture, in particular.

2. Prior Art

There are many types of lighting fixtures which are known in the art. These include recessed fixtures, surface mounted fixtures, track-light fixtures and the like. Most of the known light fixtures use incandescent light sources therein. However, incandescent light sources have a short life and are inefficient. The number of lumens generated per electrical watt consumed is not economical and is generally in the area of 14 to 17 lumens per watt. In addition, these types of light sources generally use a thin filament which glows when heated by electrical power, and tends to burn out or break rather easily.

Also, incandescent light sources tend to generate a large amount of heat which is given off into the surrounding area. This has the secondary shortcoming of producing heat in many places where excessive heat is not desired. Consequently, it becomes necessary to use air conditioning equipment or the like to eliminate this unwanted heat. Consequently, incandescent light sources tend to be energy consumers and wasters.

Several types of alternative light sources are known in the art. For example, fluorescent, high-pressure sodium and metal halide lamps and the like (also known as energy efficient light sources) are typical. These light sources generally tend to operate quite efficiently and provide 50 to 120 lumens per watt. The lower wattages do not, as a rule, produce excess heat during operation.

However, these alternative light sources are normally not interchangeable with incandescent lamps or bulbs. For one thing, the different light sources may have different couplings. The "Edison-base" coupling which is common in the ordinary incandescent light fixture will not accept standard fluorescent fittings. Although single ended high pressure sodium and metal halide lamps are available and can be screwed into an Edison-base socket, they cannot be successfully operated because most arc discharge lamps require a ballast to operate the lamp. Since the ballast may be relatively large, it usually cannot be mounted within the interior of the existing fixture.

In order to convert an existing inefficient incandescent lighting system to a more efficient light source, it has been necessary to replace the existing lighting fixture with a totally new lighting fixture that incorporates the proper socket configuration and ballast assembly in a new fixture.

Consequently, it is highly desirable to develop light fixtures which permit these alternative light sources to be retrofitted into existing electrical system hardware efficiently and economically.

Generally cylindrical lighting fixtures (whether round or square in configuration) are a highly desirable and extensively used light fixture. Typically, a cylindrical fixture is mounted above a specific area upon which light is to be projected. The fixture may be wall or ceiling mounted or suspended from the ceiling by a mounting stem. A conventional electrical or Edison socket is mounted in the cylinder at the base or top end thereof.

The first generation of compact single ended fluorescent lamps became available more than 20 years ago. These lamps were initially low wattage, 5, 7, 9 lamps, e.g., watts. These lamps were followed by 13, 18, 26 watt lamps. These lamps were, typically, twin-tube or quad-tube designs. They were designed to run on magnetic ballast and used trace amounts of mercury to operate successfully. Recently, higher wattage lamps were developed, i.e., 32, 42 watts and the like as well as triple-twin-Tube lamps. Also, an amalgam component was added into the gas mixture in the gas mixture to optimize the light output at higher temperatures than the old mercury filled lamps.

Higher wattage lamps generate more heat. Excessive heat made it more difficult for fixture manufacturers to design fixtures that would run cool enough not to cause the lamps to fail prematurely.

In general, the newer amalgam lamps have helped alleviate the excessive heat condition, but thermo-problems are still a significant problem, especially in ceiling recessed down light fixtures with lamps burning in a "base up" position. That is, heat from the lamp operation rises, thus, elevating the temperature in the upper, closed end of the fixture where the amalgam pellet is located in the lamp. The cap area must be kept relatively cool because temperatures above 140° C. will result in short lamp life.

Conversely, the lamp reaches optimum efficiency when the lower portion of the lamp, or mixing chamber, (where a mixture of mercury and amalgam gases blend together) is at an elevated temperature. To optimize the performance of the lamp it is essential that a proper mixture of gases in the proper amount come together in the mixing chamber.

According to the GE product information for OEM's lamp performance, "The performance parameters, such as luminous output; lamp voltage and power depends on the mercury vapor pressure in the discharge tube. The mercury vapor pressure is a function of the thermal condition around the glass tubes and the amalgam."

SUMMARY OF THE INSTANT INVENTION

This invention is directed to a retrofit kit or lighting fixture which permits fluorescent or similar energy efficient light sources (or bulbs) to replace incandescent light bulbs in conventional recessed downlight style fixtures or surface mounted cylindrical lighting fixtures of the square or round shape. The kit includes a ballast assembly, a fluorescent light source socket and a plurality of conductors as the essential components to fit into the existing fixture. The kit also includes a socket extender and mounting devices for securing the fluorescent socket to the existing can.

The retrofit lighting fixture includes a threaded connector, a ballast, a heat exchanger, a fluorescent light source connector socket and a threaded body for receiving a reflector made of glass or metal. Also, a reflector trim can be included in the invention.

The invention has a built-in heat-sink, that keeps the lamp base, cap temperature within lamp specifications.

BRIEF DESCRIPTION OF THE DRAWINGS

FIG. 8 is a partially broken away view of a conventional light fixture with the push-lock version of the kit of the instant invention installed therein.

DESCRIPTION OF PREFERRED EMBODIMENTS

Figure 1:
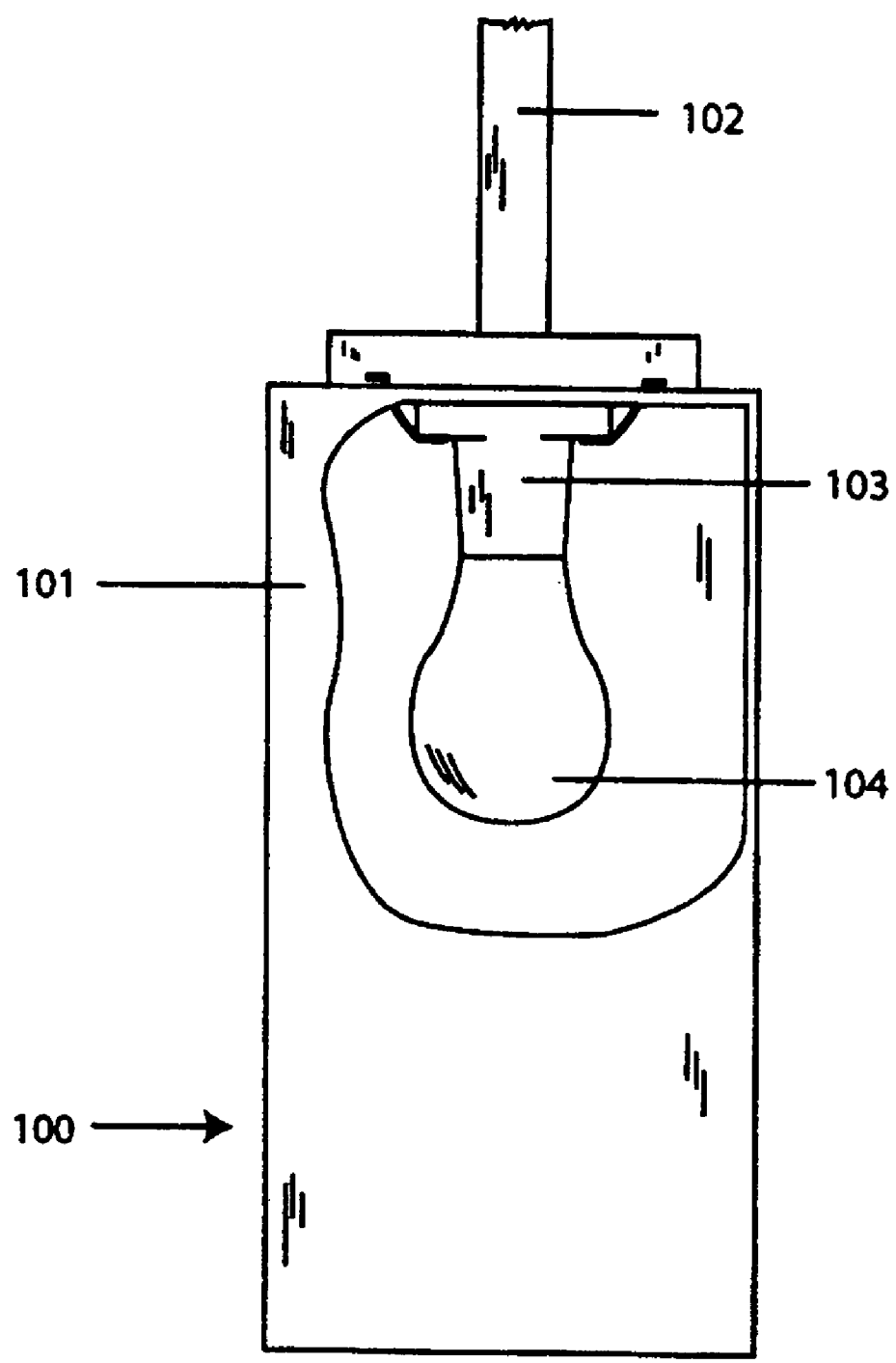
FIG. 1 is a partially broken away cylindrical light fixture known in the art.

Referring now to FIG. 1, there is shown a partially broken away cylindrical light fixture 100 known in the art. The fixture 100 includes an elongated canister or can 101 which can be of round, square or any other cross-sectional configuration. The most prevalent cans are cylindrical and about 6"-8" in diameter and about 12" in length. Typically, but not limitatively, these cans are mounted on elongated stems 102 but can also be mounted directly onto a junction box (J-box). A conventional Edison-type socket 103 is mounted on the interior top end surface of the can. In the prior art, a conventional incandescent light bulb 104 is inserted into the can and the socket.

These fixtures originally provided a desirable function and operation. However, with the obvious advantages of fluorescent lights, the incandescent source fixture is no longer desirable. The expenditure involved in replacing these fixtures is considerable. Thus, it is desirable to convert such fixtures to use of fluorescent light sources, preferably in situ.

Figure 2:
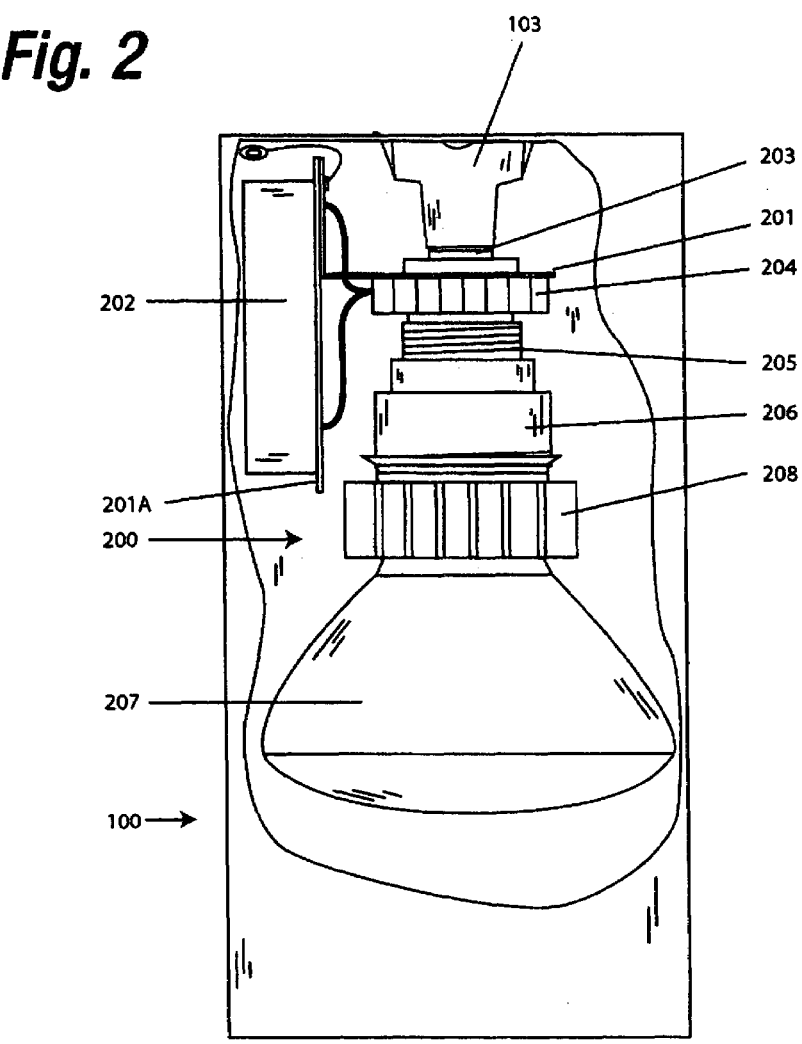
FIG. 2 is a partially broken away cylindrical light fixture including the retrofit fluorescent light assembly of the instant invention.

Referring now to FIG. 2, there is shown a partially broken away view of the same can fixture 100 with a conventional socket 103 therein.

In accordance with the instant invention, a retrofit fluorescent assembly 200 is used to replace the incandescent light source 104 (see FIG. 1) without any significant alteration of the existing can structure. Rather, the incandescent bulb is removed and the assembly 200 of the instant invention is inserted into the existing can 100.

In this invention, the assembly 200 includes a threaded male Edison end 203 (see FIG. 3) which is adapted to be threadedly engaged with the existing Edison socket 103. A mounting bracket 201 is attached to the threaded connector 203 by rivets or other suitable means. The mounting or support bracket 201, typically a T-shaped bracket in one embodiment, supports an electronic ballast 202. The electronic ballast 202 is attached to the bracket arm 201A by any suitable means such as screws, rivets or the like. An incandescent lamp socket 205 is joined to the ballast bracket 201 by wireway spacer assembly 204. A threaded collar 206 is attached to the lamp socket 205. Typically, the collar 206 is threadedly engaged with socket 205 and secured in place by a suitable adhesive, epoxy or the like. A reflector glass 207 is threadedly attached to the collar 206. A heat exchanger 208 is mounted on the threaded end of reflector glass 207 as described infra.

Figure 3:
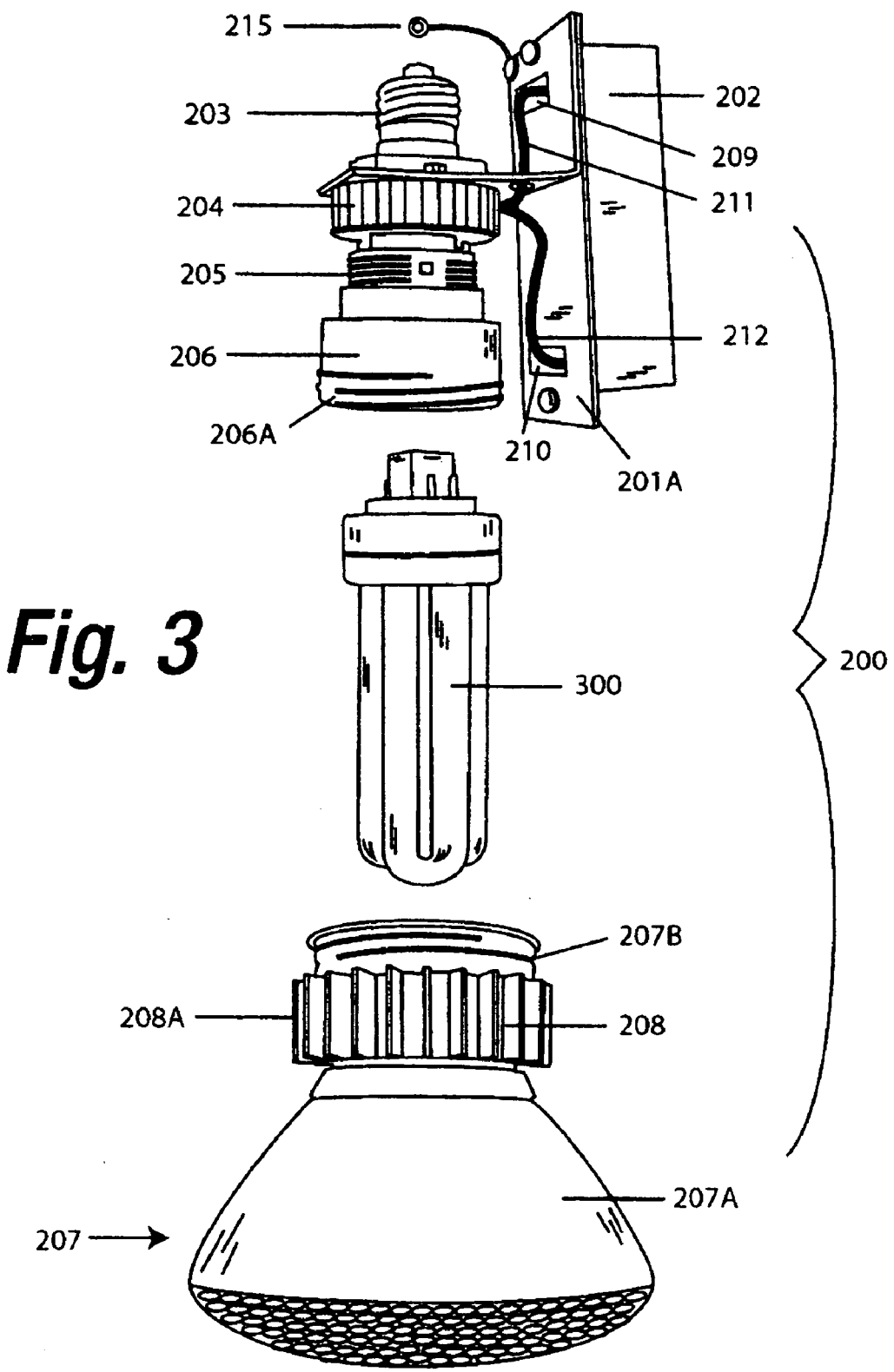
FIG. 3 is an exploded view of the retrofit fluorescent light assembly of the instant invention.

Referring now to FIG. 3, there is shown an exploded view of the fluorescent light assembly 200 of the instant invention. An electronic ballast 202 of suitable size and shape is provided. One type of such ballast is a programmed-start electronic ballast manufactured by Advance Transformer Co. under the trademark SmartMate. The ballast 202 is, typically, fabricated in a plastic or metal case and measures about 4½"×2½"×1". The ballast is mounted on arm 201A of support bracket 201 which, in a preferred embodiment, is substantially T-shaped. Of course, any suitable ballast is contemplated.

A conventional male threaded Edison socket base 203 is attached by rivets or the like to arm of the bracket 201. A ballast 202 is attached to the other arm of the bracket arm 201A.

A conventional fluorescent light source socket 205 with a threaded external surface is attached to or manufactured with the electronic ballast 202.

One or more apertures 209 and 210 are provided in the arm 201A of the bracket 201 through which appropriate conductors 211 and 212, suitably insulated, are passed from the electronic ballast 202.

In a preferred embodiment, a suitable ground connection 215 is provided. The ground connection can be attached to the bracket 201 in the instance where the bracket is fabricated of aluminum or other electrically conductive material.

A plastic or metal connecting collar 206 is threadedly attached and, preferably, securely fastened to the threaded end of the source socket 205 by a suitable adhesive such as glue or epoxy. The collar 206 (for reflector glass) includes external threads 206A at the outer end thereof.

A suitable fluorescent light source such as a 4-pin electronic fluorescent tube lamp 300 is adapted for insertion into the source socket 205. Suitable lamps are manufactured by GE, Phillips, Sylvania or others.

A reflector glass 207 includes an aluminized glass portion 207A which has aluminum threads 207B secured thereto by suitable high temperature cement. The aluminum threads are selected to engage with the external threads 206A on the outer end of reflector glass socket collar 206 or other attachment configuration. Twist lock, push-in or the like fluorescent socket 205 accepts the lamp 300.

A heat sink 208 is formed with or attached to the aluminum threads 207B which are attached to, or form as a part of the aluminized glass reflector 207. The heat sink 208, in this embodiment, comprises a collar-like component which surrounds the neck of the reflector glass 207. The heat sink, in this embodiment, includes a plurality of fins 208A which radiate outwardly from the collar so as to advantageously disperse heat away from the assembly.

In a preferred embodiment, a suitable ground connection 215 is provided. The ground connection can be attached to the bracket 201 in the instance where the bracket is fabricated of aluminum or other electrically conductive material.

In application, the conventional incandescent bulb 104 (FIG. 1) is threadedly removed from the can 101. The retrofit assembly 200 (FIG. 2) of the invention is then threadedly engaged with the existing Edison-type socket 103 in the can. The conversion from an incandescent light fixture to a fluorescent light fixture is readily completed.

Figure 4:
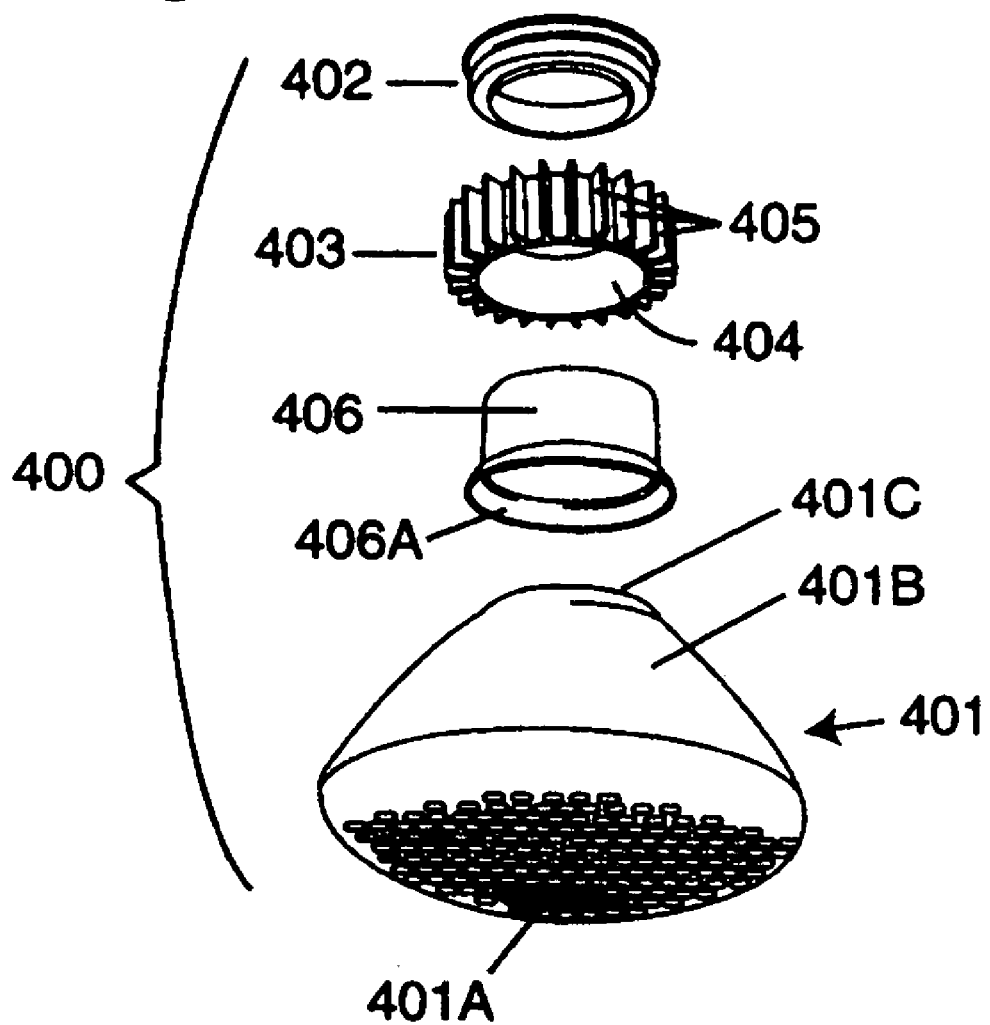
FIG. 4 is an exploded view of one embodiment of a reflective glass cover for the fluorescent light assembly of the instant invention.

Referring now to FIG. 4, there is shown an exploded view of one embodiment of a reflective glass cover assembly 400 for use in fluorescent light source assemblies.

The assembly 400 includes an aluminized glass reflector 401 which is fairly conventional in the art. That is, a glass unit 401 is fabricated with a generally flood-light configuration with the outer, closed end 401A flaring outwardly. The inside coned surface of the glass unit 401 is coated with aluminum to provide a reflective surface 401B. This aluminum surface redirects almost all of the light from the light source (e.g.

source 300 in FIG. 3) within the glass unit out of the fixture, eliminates glare and may mimic the look of an incandescent lamp.

A support neck 406 comprises a generally cylindrical component fabricated of aluminum or similar material. The outer end 406A of the neck 406 is flared outwardly to conform to the shape of the inner end of the glass reflector 401C.

A heat sink reflector attachment 403 comprising a ring 404 and a plurality of fins 405 radiating outwardly from the ring 404 is fabricated of extruded aluminum, for example, but not limited thereto. The ring 404 is configured to surround the neck 406. The heat sink 403 is designed to remove heat from the internal space within the glass reflector 400 in the proximity of the base end of the light source (see source 300 in FIG. 3).

A threaded attachment collar 402, typically fabricated of aluminum, is formed by spinning, draw forming or the like. The threaded portion of the collar is adapted to engage the threads on the socket collar 206 (see FIG. 3). The assembly 400 is completed by placing the heat sink 403 around the inner sleeve 406 which is joined to collar 402. These components are swaged or fastened with suitable fasteners or bonding material, unitizing these parts together. The outer end 406A of the neck 406 is secured to the open end 401C of the glass reflector 401, typically by a high temperature cement which bonds the metal heat-sink attachment 403 to glass 401. Alternately, the entire assembly can be die-cast in one or more sections.

The glass reflector assembly 400 is especially (but not limited to) useful with newer fluorescent light sources which use an amalgam filler in place of the older Mercury filled tubes.

That is, the glass reflector 401 surrounds the amalgam tubes. This arrangement tends to raise and maintain a constant temperature of the amalgam tubes while in use thereby enhancing the illumination capacity thereof. At the same time, the heat sink 403 absorbs and dissipates the heat which collects at the base of the fluorescent source when the fixture is in a down-light position. That is, inasmuch as heat rises, the heat trapped within the glass reflector 401 accumulates adjacent the socket and, thus, the cathodes of the light source. This arrangement would tend to produce an unfavorable reaction in the light source and shorten the useful life thereof. However, the heat sink 403 conducts the heat within the glass reflector 401 outwardly away from the tube cap end and radiates the heat into the ambient outside of the reflector glass into the can and into the atmosphere.

Thus, the glass reflector assembly 400 produces a raised, constant temperature adjacent to the mixing chambers of the fluorescent tubes thereby increasing the lamp light output and decreasing the wattage draw within the system. At the same time, the heat sink removes the excess heat from the cathode area of the fluorescent tubes thereby extending the lifetime of and reducing the power usage of such light sources. In addition, lamps in this assembly, even though consistently putting out more light, tend to draw less power. Thus, increased efficiency and reduced operating costs are unexpectedly achieved with this assembly.

Figure 5:
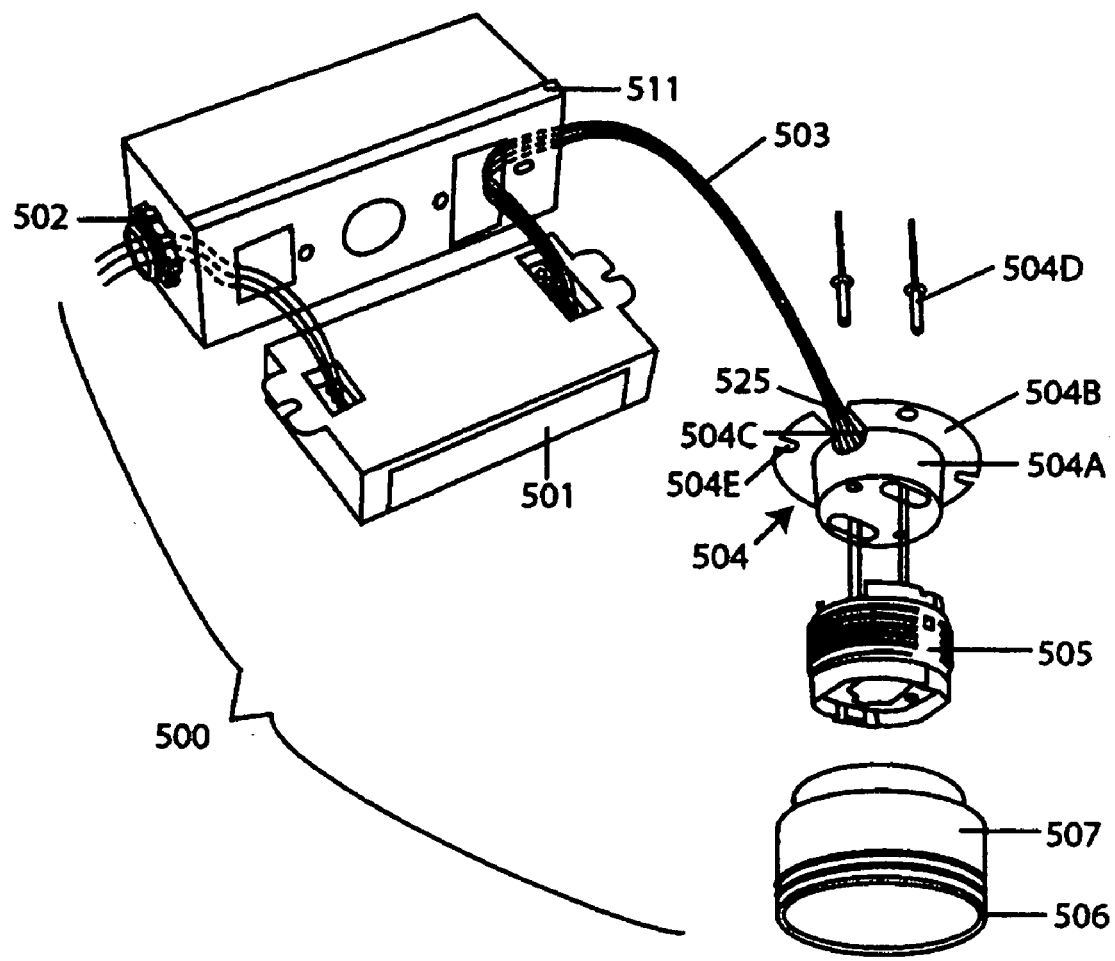
FIG. 5 is an exploded view of a hardwire version of the kit of the instant invention.

Referring now to FIG. 5, there is shown an exploded view of one embodiment of the instant invention, namely a hard-wire retrofit kit 500. This kit is used as a down light retrofit kit to replace incandescent light sources or bulbs with fluorescent light source or tubes.

The kit 500 includes a four wire electronic ballast. That is, four conductors are run from the fluorescent socket 505 to the electronic programmed or self start ballast 501 which is fixedly mounted to junction box 511 which has a push-lock or threaded EMT connector 502 mounted thereto. Typically, the fluorescent or electronic ballast 501 and is assembled in a metal or plastic housing. which is joined to the J-box 511 in any convenient fashion such as screws (not shown) or the like.

The kit also includes a suitable length, typically up to about 30°, cable 503 formed of a plurality of connector wires 525 enclosed in an insulating sheath. The free ends of the wires in cable 503 are initially wrapped together in a sleeve 525 but are ultimately separately connected to the ballast 501 via J-box 511 when the kit 500 is in place.

In the kit 500, the four individual wires in cable 503 are passed through the end of socket mounting flanged cup housing 504 and connected to the terminals in socket 505. The socket 505 is mounted to the housing 504 by screws, rivets or other suitable fastening means 504D. Socket 505 is a conventional fluorescent light socket, typically, a 4-wire, twist-and-lock (or push-in) socket is mounted on the top end of housing 504. In a preferred embodiment, socket 505 is a 4-pin, twist-lock socket although other sockets can be utilized. The housing 504 is, typically, a hollow cylindrical or box-like structure 504A with a flange 504B extending outwardly therefrom. The housing 504 may be fabricated of any suitable material including, for example, aluminum, plastic or the like, as a unitary member or from a number of components which are joined together in any suitable fashion such as rivets, screws, welding or the like.

As will be seen, the housing 504 also includes an opening 504C in the sidewall of the cylindrical or box-like structure 504A. The opening 504C communicates with the interior of the structure 504A so that the cable 503 can exit from the side of the housing 504 or directly from the bottom end thereof, as desired. The openings 504E are provided at the edges of the bottom end of housing 504 for mounting as described infra.

In one example, the extender 507 is threadedly attached to socket 505 and these components are sealed in position by an adhesive, epoxy or the like to prevent mutual rotation thereof. The outer surface of extender 507, typically, includes threads 506 which are adapted to threadedly engage a conventional metal or glass reflector which may be aluminized or plated, if desired.

Figure 6:
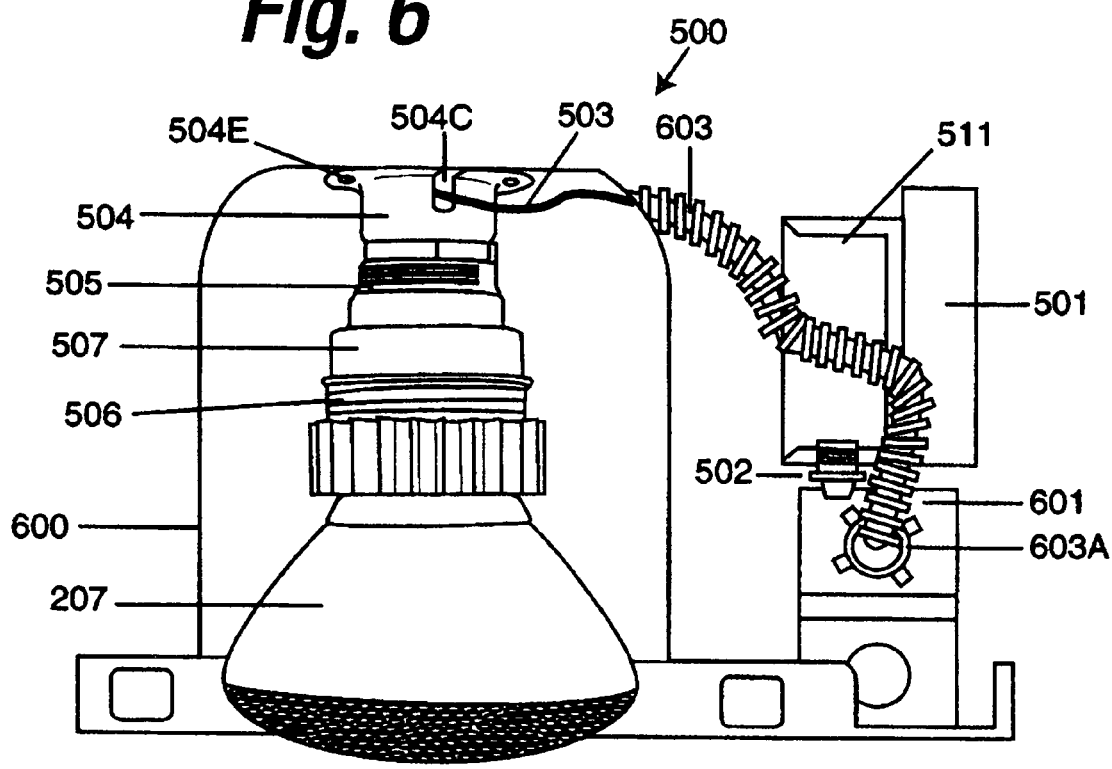
FIG. 6 is a partially broken away view of a conventional light fixture with the hardwire version of the kit of the instant invention installed therein.

Referring now to FIG. 6, there is shown a partially broken away light fixture can 600 with the kit 500 installed therein. To best understand the advantages and utility of the kit 500, it is noted that the can 600 is a conventional recessed light fixture known in the art. The junction box 601 is also conventional and is mounted with the can 600 in the original installation. A flex conduit 603 is a UL approved conduit mounted between the can 600 and the junction box 601. These significant features and components of a conventional light fixture are retained. In addition, the light fixture 600, the junction box 601 and the flex conduit 603 and coupler 603A remain substantially in situ during the retrofit operation.

To install the retrofit kit 500, the existing trim, if any, of the light fixture is removed to gain access to the can 600. The can 600 may be separated from the fixture housing to access the existing junction box 601, if desired. The pre-existing Edison-type socket is removed from can 600. The pre-existing wires connected from the Edison socket to the junction box 601 via the flex conduit 603 are also removed. The J-box 511 of the kit (see FIG. 5), which is joined to the ballast 501, is then mounted onto the existing junction box 601 by means of the push-lock or threaded EMT connector 502. The cable 503 is fed through the flex conduit 603 from the can 600 to the junction box 601. As noted above, the cable 503 may include sleeving or encapsulated wire ends for convenience, if desired. The four wires from fluorescent light socket 505 are passed through the flex conduit 603 into the J-box 601. The four socket wires are fed through the EMT connector 502 into ballast splice box 511 for ultimate connection to the ballast 501.

The housing 504 is then installed in the can 600 by connecting appropriate screws (those left in the can when the original Edison socket is removed) through the slots 504E in the flange 504B (see FIG. 5). The can 600 is reseated into the ceiling, if necessary.

A suitable light source 300 (see FIG. 3) is plugged into the fluorescent socket 505 to complete the conversion. The original fixture trim (not shown) is reinstalled. The reflector assembly 207 (see FIG. 3) is screwed onto threads 506 of socket collar 507 and the light fixture 600 has been converted to a fluorescent light fixture capable of using a 4-wire fluorescent lamp.

Figure 7:
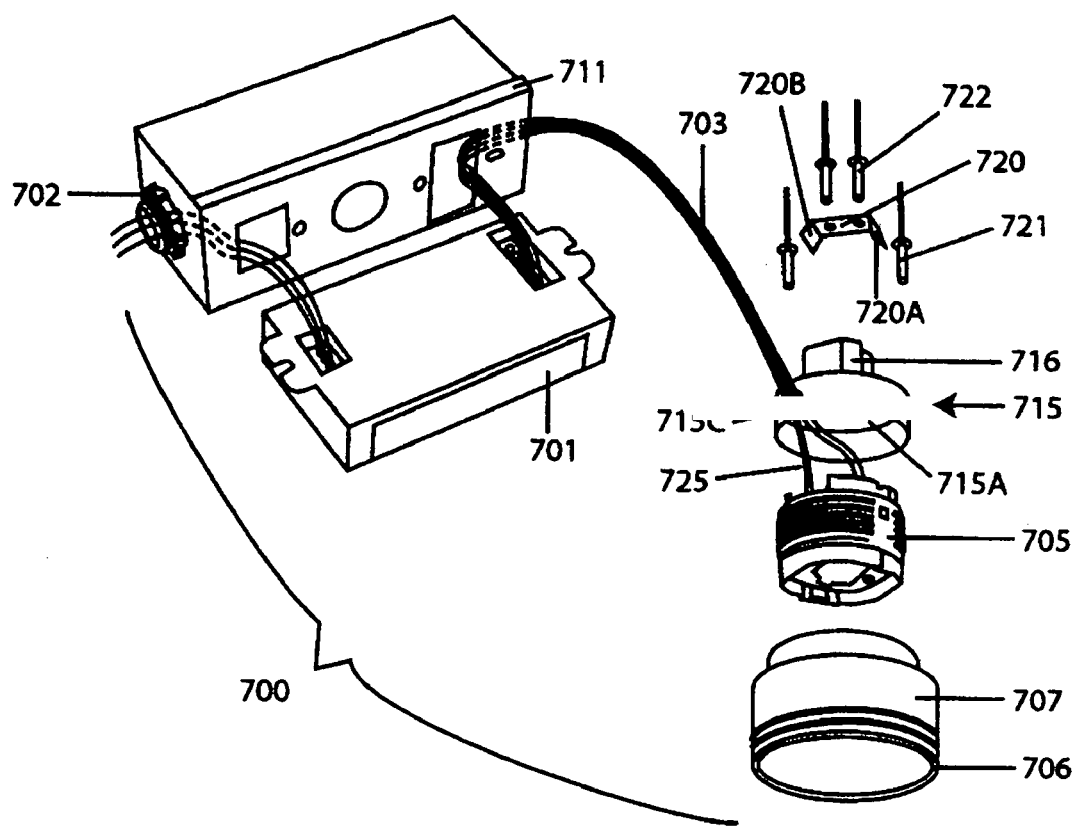
FIG. 7 is an exploded view of a push-lock version of the kit of the instant invention.

Referring now to FIG. 7, there is shown an exploded view of another embodiment of the instant invention, namely the push-lock retrofit kit 700. The kit 700 is used as a down light retrofit kit to replace incandescent lights with fluorescent lights.

The kit 700 is quite similar to kit 500 described supra. Thus, kit 700 includes an electronic ballast 701 which is mounted on a junction box 711 which has a push-lock or threaded EMT connector 702 mounted thereto. The electronic ballast 701 is known in the art and is assembled in a metal or plastic housing which is joined to the J-box in any convenient fashion, as noted above.

The kit 700 also includes a suitable length of cable 703, typically up to about 30°, formed of a plurality of connector wires 725 enclosed in an insulating sheath similar to the cable 503 described supra. Again, the free ends of the wires in cable 703 are ultimately connected to the ballast 701 via J-box 711 (or splice box) when the kit 700 is in place.

In the kit 700, the four individual wires in cable 703 are passed through housing 715 and connected to terminals in the socket 705. The housing 715 includes a hollow cylindrical section 715A which is attached to the socket 705 and joined thereto by rivets 721, screws, adhesive or the like. The housing 715 also includes an elongated stem base or guide post 716 which is, typically, formed integrally with the cylindrical section 715A. The housing 715 may be fabricated of plastic or the like as a unitary member or from a number of components which are joined together in any suitable fashion.

As will be seen, the housing 715 includes an opening 715C in the sidewall of the cylindrical section 715A. The opening 715C communicates with the interior of the cylindrical section 715A so that the cable 703 can exit from the side of the housing 715.

A conventional fluorescent light socket 705, typically, a 4-wire, twist-and-lock (or push-in) socket is provided. The socket 705 is connected to the individual wires of cable 703 prior to the attachment of the housing 715.

Threaded socket collar 707 is attached to the outer end of the socket 705. In one example, the collar 707 is threadedly attached to socket 705 and these components are sealed in position by an adhesive, an epoxy or the like to prevent mutual rotation thereof.

The outer surface of collar (or extender) 707 includes threads 706 which are adapted to threadedly engage a conventional metal or glass reflector which may be aluminized, if desired.

A locking strip 720 is mounted on the end of stem base 716 by rivets 722, screws or other suitable means. The locking strip 720 is preferably fabricated of a spring metal. In a preferred arrangement, the locking strip 720 includes ends 720A and 720B thereof which flare outwardly and downwardly away from the guide post 716. Thus, the locking strip 720 will engage the threaded portion of an existing Edison-type socket 806 (see FIG. 8) in the existing can and prevent removal of the assembly 700 from the can.

Referring now to FIG. 8, there is shown a partially broken away light fixture can 800 with the kit 700 installed therein. To best understand the advantages and utility of the kit 700, it is noted that the can 800 (similar to can 600 described supra) is a conventional recessed light fixture known in the art. The junction box 801 is also conventional and is mounted with the can 800 in the original installation. A flex conduit 803 is mounted between the can 800 and the junction box 801. In addition, the adjustable mounting bracket 805 may be present in can 800 to support the existing Edison-type socket 806. These significant features and components of a conventional light fixture are retained. In addition, the light fixture 800, the junction box 801 and the flex conduit 803 remain substantially in situ during the retrofit operation.

To install the retrofit kit 700, the existing trim, if any, of light fixture 800 is removed to access the can 800. The can may be separated from the fixture frame, if desired, to access the existing J-box 801. The ballast 701 of the kit is mounted on splice box 711 which attaches to junction box 801 by means of the EMT or push-lock connector 702 on J-box 711 of the kit. Alternatively, a threaded EMT connector can be used for a flexible connection. The pre-existing wires supplied from the socket 806 to the junction box 801 via flex conduit 803 are disconnected or removed.

At this time, the cable 703 is fed through the flex conduit 803 from the can 800 to the junction box 801. The wires from the ballast 701 and the fluorescent socket 705 are connected within splice box 711 and to the existing power lines in the junction box 801. The fluorescent socket 705 (inside housing 715) is installed in the can 800 by pushing the base 716 of housing 715 with the locking strip 720 thereon into the existing Edison socket 806 which remains in the can. The locking strip 720 flexes upon insertion into the socket 806 such that the ends thereof interact with the threads in socket 806. The housing 715 cannot be removed from socket 806 by unscrewing the housing 715 which is affixed to socket 705. Thus, kit 700 is securely attached to the can 800. The can 800 is reinstalled into the existing structure.

The metal (or glass) reflector 810 and fixture trim (if any) are reinstalled. The light fixture has been converted to a fluorescent light fixture capable of using a 4-wire fluorescent ballast and 4-pin electronic CFL light source with the added feature of being a substantially tamperproof fixture.

Thus, there are shown and described unique designs and concepts of retrofit fluorescent light fixtures for replacing incandescent light fixtures. The retrofit units include 4-wire retrofit kit, a screw-in ballast unit, a push-in locking socket, a high efficiency fluorescent light fixture assembly and combinations thereof. While this description is directed to particular embodiments, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

The invention claimed is:

1. A secure connector in a retrofit assembly for converting a light fixture from incandescent to fluorescent lighting in a fixture which includes a conventional screw thread electrical socket, including a socket for receiving a fluorescent light source at one end of said socket, a housing having one end mounted to a second end of said socket, and a flexible strip which is slightly longer than the diameter of the conventional screw thread electrical socket mounted athwart a second end of said housing with at least one end of said flexible strip extending outwardly from the second end of said housing.

2. The retrofit assembly recited in claim 1 including, a support bracket for supporting the conventional screw thread electrical socket, and an electronic ballast mounted on said bracket and electrically connected to the conventional screw thread electrical socket.

3. The retrofit assembly recited in claim 1 wherein, said support bracket is mounted in the light fixture so as to effect a temperature increase relative to said fluorescent light source means to enhance the light out put thereof.

4. The retrofit assembly recited in claim 3 including, heat sink means attached to said fluorescent lamp socket for dissipating heat therefrom to enhance the useful life of said fluorescent light source.

5. The retrofit assembly recited in claim 1 including, a reflector which is adapted to be threadedly attached to said screw threaded electrical socket.

6. The retrofit assembly recited in claim 5 wherein, said reflector is formed of glass or metal.

7. The retrofit assembly recited in claim 6 wherein, said glass is coated with a light reflecting material.

8. The retrofit assembly recited in claim 5 wherein, said reflector is aluminized glass.

9. The retrofit assembly recited in claim 8 including, aluminum threads bonded to the reflector glass.

10. The retrofit assembly recited in claim 5 including, heat sink means attached to said reflector for dissipating heat therefrom.

11. The retrofit assembly recited in claim 5 including, a heat exchanger mounted to said reflector to remove heat from said assembly when in use.

12. The retrofit assembly recited in claim 11 wherein, said heat exchanger comprises a ring which surrounds one end of said reflector, and a plurality of fins radiating outwardly from said ring.

13. The retrofit assembly recited in claim 11 wherein, said heat exchanger is formed of a metal.

14. The retrofit assembly recited in claim 1 including, a fluorescent light source mounted in said fluorescent light source socket.

15. The assembly recited in claim 1 including, a can, a junction box, a flex conduit connected from the can to said junction box, a splice box, an electronic ballast mounted to said splice box, and a multi-conductor cable adapted to be connected from said socket to said ballast via said flex conduit, said junction box and said splice box.

16. The secure connector recited in claim 1 wherein, said flexible strip is adapted to flex when said housing is inserted into the screw thread electrical socket and to interact with the threads in the conventional screw thread electrical socket to prevent removal of said housing from the conventional screw thread electrical socket.

17. A secure connector in a retrofit lighting assembly which includes a conventional screw thread electrical socket, including a socket for receiving an energy efficient light source at one end thereof, a housing with one end mounted to a second end of said socket, and a flexible strip which is slightly longer than the diameter of the conventional screw thread electrical socket attached substantially horizontally across a second end of said housing with at least one end of said strip extending outwardly from the second end of said housing.

18. The retrofit assembly recited in claim 17 wherein, said flexible strip is adapted to flex when said housing is inserted into the conventional screw thread electrical socket and to interlock with the threads in the conventional screw thread electrical socket to prevent removal of said housing from the conventional screw thread electrical socket.

* * * * *